United States Patent [19]

Spencer et al.

[11] Patent Number: 5,082,483
[45] Date of Patent: Jan. 21, 1992

[54] ENCLOSURES FOR SLAG PELLETIZATION APPARATUS AND METHOD OF OPERATION THEREOF

[75] Inventors: Kenneth W. Spencer, Ancaster; David T. Horvat, Hamilton, both of Canada

[73] Assignee: National Slag Limited, Hamilton, Canada

[21] Appl. No.: 535,613

[22] Filed: Jun. 8, 1990

[51] Int. Cl.⁵ .......................................... C03B 37/005
[52] U.S. Cl. .................................... 65/19; 65/141; 264/8; 425/8
[58] Field of Search ..................... 264/5, 8; 425/6, 8; 75/333, 334; 65/19, 141

[56] References Cited

U.S. PATENT DOCUMENTS

| | | | |
|---|---|---|---|
| 475,575 | 5/1892 | Lawton et al. | 425/7 |
| 1,356,780 | 10/1920 | Nicol | 426/7 |
| 3,738,820 | 6/1973 | Osborne et al. | 65/19 |
| 3,912,487 | 10/1975 | Sharanov et al. | 65/141 |
| 4,115,089 | 9/1978 | Metz et al. | 65/19 |
| 4,277,273 | 7/1981 | Legille et al. | 65/19 |
| 4,284,393 | 8/1981 | Brunosson et al. | 425/7 |
| 4,289,519 | 9/1981 | Monteyne | 65/19 |
| 4,461,636 | 7/1984 | Gagneraud et al. | 65/141 |
| 4,758,260 | 7/1988 | Geropp et al. | 65/19 |
| 4,909,821 | 3/1990 | Olginsky et al. | 65/141 |
| 4,995,894 | 2/1991 | Spencer et al. | 65/19 |

Primary Examiner—Mary Lynn Theisen
Attorney, Agent, or Firm—Rogers & Scott

[57] ABSTRACT

The invention provides a new enclosure for slag pelletizers, and a new method of operating such an enclosure, that minimizes the noise and the escape into the ambient atmosphere of hydrogen sulfide and airborne particulate material produced by the pelletization. The enclosure consists of impereable walls and a roof, the pelletized material being removed through an openable door at one end that is closed during the process. The enclosure has three successive zones, in the first of which contains the pelletizer, this being supplied with only the amount of water needed for pelletization. In the second zone containing the slag pile a plurality of very fine mist producing nozzles supply water to the gases to cool them using its latent heat of evaporation, the amount of water supplied being such as to cool them as much as possible while being limited so that it all remains vaporized and cannot enter the slag pile to increase its moisture content. In the third zone the quantity of water supplied is sufficient to condense the water vapor, entraining the soluble hydrogen sulfide and the particulate matter. The condensed water and entrained material is removed and treated, preferably with waste alkaline water, to stabilize the hydrogen sulfide, remove the particulate material, and recycle the water. The non-condensible gases exiting from the top of the third zone can pass through a chimney to the atmosphere or to a gas scrubber for further scrubbing.

16 Claims, 2 Drawing Sheets

ENCLOSURES FOR SLAG PELLETIZATION APPARATUS AND METHOD OF OPERATION THEREOF

FIELD OF THE INVENTION

This invention is concerned with improvements in or relating to enclosures for slag pelletization apparatus, and in particular to the provision of an improved enclosure in which gases and vapours produced during the pelletization process can be cleaned to reduce the amounts of hydrogen sulfide gas and airborne particulate matter contained therein before their escape into the ambient air. The invention also provides a new method of operating such an enclosure.

DESCRIPTION OF THE PRIOR ART

The pelletization of the slags that are produced in the manufacture of iron and steel is now a well-established industry. These slags are either air cooled in pits and crushed, granulated and ground, or pelletized, the pelletization producing a material that is better suited for utilization, for example, as a lightweight aggregate for road-building and the manufacture of concrete blocks. A pelletization process that has been commercially very successfull is described in our U.S. Pat. No. 3,594,142, issued 20th July 1971, the disclosure of which is incorporated herein by this reference. The process involves combining the molten slag with a carefully controlled proportion of water and throwing it through the air for a sufficient distance for it to separate and cool to produce self-sustaining spherical pellets before it reaches the ground. A radially finned drum rotating about a horizontal axis, called a rotary pelletizer, is used to throw the molten slag into the air, the slag usually being poured directly from a slag runner onto the top of the drum, the water being added to the slag through spray nozzles located above the drum, which is internally cooled to help protect it against the deleterious effects of the hot slag, whose temperature is usually above 1300° C. (2400° F.) for it to be in the molten state.

For safety reasons the pelletization process has usually been conducted inside a large three-walled enclosure, the side furthest from the pelletizer being open to permit removal of the pellets. The top of the enclosure is covered with a coarse wire mesh screen to contain stray pellets and particulate material produced by the process, while permitting escape of the large quantities of vapours and gases from the process. Such slags almost universally contain an appreciable proportion of sulfur (e.g. about 1.0 to 2.0% by weight) and at the high temperatures involved in the presence of substantial quantities of water this results in the production of hydrogen sulfide ($H_2S$) gas. It is one of the many advantages of our prior pelletization process that a high proportion of this sulfur is retained in the pelletized slag, but substantial quantites of the hydrogen sulfide are still produced. The gas is extremely smelly even at very low concentrations, e.g. 1-20 p.p.m., where it is not toxic, and this can make it somewhat of a nuisance. Fortunately is also chemically reactive and water soluble so that adequate scrubbing with water will reduce the atmospheric content to the required level (i.e. less than 20 p.p.m.).

The particulate material produced varies in size and texture from dust size particles to low overall density strands and/or fibres of the slag material, of size up to about 15 cm (6 ins) in length and up to 0.5 mm (0.02 in) diameter, much like the well-known "rock wool" that is deliberately produced for use as an insulation material. It is an unwelcome characteristic of much of this material that it can remain airborne for some time, and if it escapes from the enclosure it is distributed by air movements over the adjacent surroundings. Although this material is only produced at an average rate of about 150 g-300 g per tonne of slag processed, the daily slag production of an average furnace is about 600 tonnes, resulting in the production about 90 kg-180 kg of the particulate. Although the weight of material is not high its bulk is considerable because of its low overall density. Government standards in Ontario, Canada now require that with such a process the suspended particulate content of the ambient air be limited to 100 micrograms/cubic metre, with a minimum particle size of 40 microns, and this is a difficult standard to achieve.

As described above, the amount of water added to the slag during pelletization is carefully controlled and is kept to the minimum to try to obtain a product that is as dry as possible, e.g. less than 6% by weight of water. Most customers for pelletized slag now specify the maximum moisture content that they will accept so that it is satisfactory for their own processes, and any need for subsequent drying of a bulky, low-value product such as slag may be uneconomic. For this reason, and also because of the increasing difficulty and expense of providing satsifactory water supplies, the overall use of water should be kept to a minimum and a mimimum should be directly applied to the slag both during and after pelletization.

Definition of the Invention

It is an object of the invention to provide a new enclosure for slag pelletization that will permit water scrubbing of the pelletization process output gases and reduction of the amount of airborne particulate which can escape therefrom, all while conserving the overall use of water for this purpose.

It is another object to provide a new method of operating such an enclosure in association with a slag pelletization process.

In accordance with this invention there is provided a slag pelletization enclosure for pelletization apparatus enabling the removal from the enclosure atmosphere of water soluble gases and airborne particulate material created during the process of operation of the apparatus, the enclosure having successive first, second and third zones and comprising:

air impermeable walls and a roof, one of the walls in the third zone having a closable opening for removal of pelletized material from the enclosure interior;

the first zone having therein a pelletizer, means for feeding molten slag material to be pelletized thereto, and water supply means for supplying water to the slag prior to its pelletization in an amount and at a rate sufficient to convert it to a pyroplastic state suitable for pelletization;

the second zone containing the pile of slag pellets and having therein water supply means for supplying water to the zone to cool gases passing therethrough by use of the latent heat of evaporation of the water supplied in a quantity, at a rate, and in a particle size such that all of the water thus supplied is vapourised in the zone and the gases and entrained water vapour are cooled to a temperature above that of condensation of the water; and the third zone having therein water supply means supplying water to the zone to further cool the gases passing therethrough in a quantity and at a rate such that the gases are cooled below the condensation temperature thereof, an exit from the enclosure interior for non-condensible gases, and an exit from the enclosure interior for condensed water with any particulate material entrained therein.

Also in accordance with the invention there is provided a method of operating a slag pelletization enclosure for pelletization apparatus enabling the removal from the enclosure atmosphere of water soluble gases and airborne particulate material created during the process of operation of the apparatus:

the enclosure having successive first, second and third zones and comprising air impermeable walls and a roof, one of the walls in the third zone having a closable opening for removal of pelletized material from the enclosure interior;

the first zone having therein a pelletizer, means for feeding molten slag material to be pelletized thereto, and water supply means for supplying water to the slag prior to its pelletization;

the second zone containing the pile of slag pellets and having therein water supply means for supplying water to the zone to cool gases passing therethrough by use of the latent heat of evaporation of the water; and the third zone having therein water supply means supplying water to the zone to further cool the gases passing therethrough, an exit from the enclosure interior for non-condensible gases, and an exit from the enclosure interior for condensed water with any particulate material entrained therein;

the method including the steps of:

supplying the water to the slag in the first zone in an amount and at a rate sufficient to convert it to a pyroplastic state suitable for pelletization;

supplying this water to the second zone in a quantity, at a rate, and in a particle size such that all of the water thus supplied is vapourised in the zone and the gases and entrained water vapour are cooled to a temperature above that of condensation of the water;

supplying the water to the third zone in a quantity and at a rate such that the gases are cooled below the condensation temperature thereof;

and removing from the third zone the resultant non-condensible gases and condensed water.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
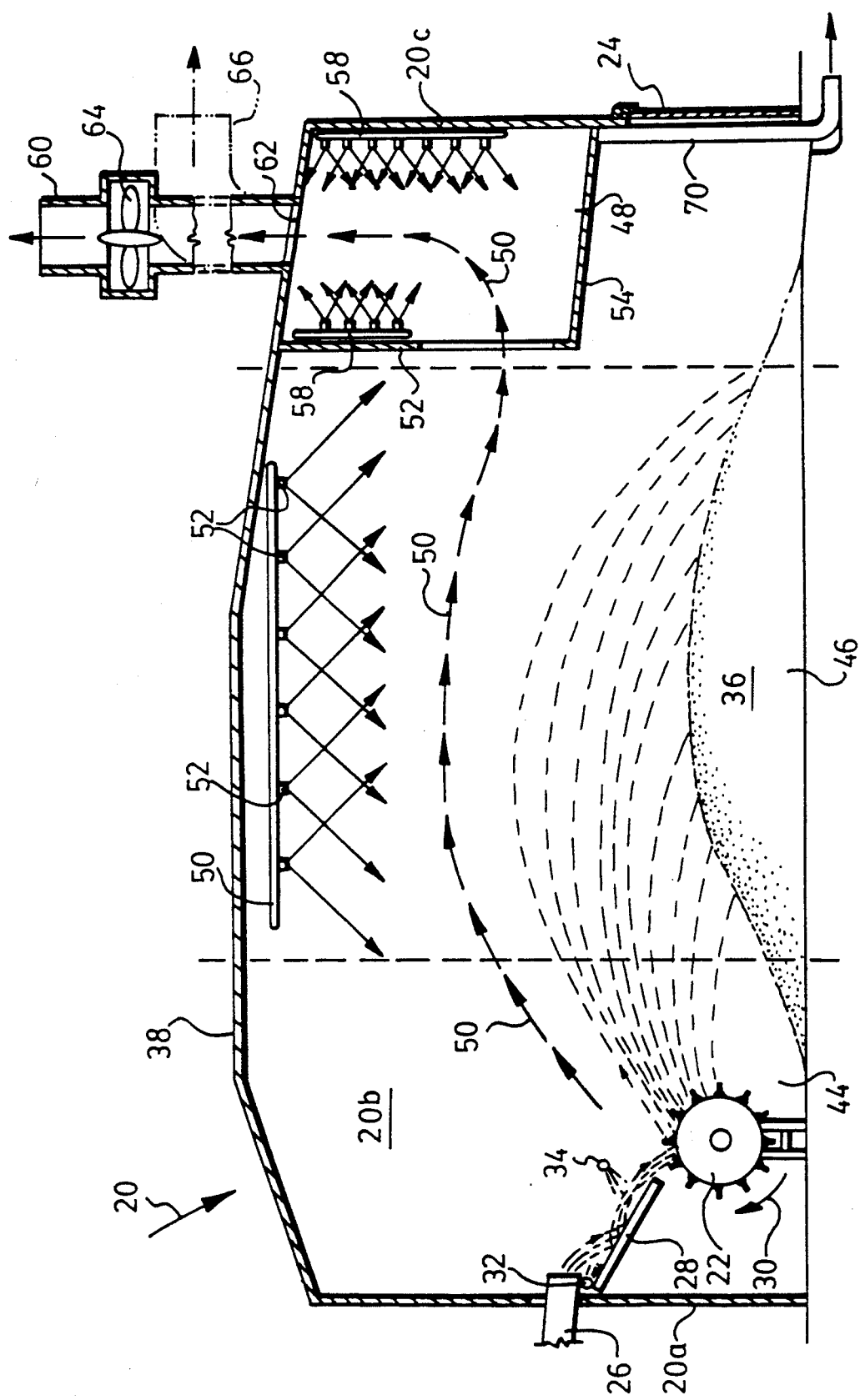
FIG. 1 is a longitudinal cross-section of the pelletizer enclosure to show the interior thereof.

The pelletizer enclosure has the general reference 20 and encloses a pair (only one seen) of rotary horizontal drum type slag pelletizers 22 disposed side-by-side, the enclosure comprising an end wall 20a adjacent the pelletizers and two side walls 20b (only one seen), the other end wall 20c being provided with an opening closable by a door 24 to permit removal of the pelletized material. Molten slag from a blast furnace (not shown) flows along a respective slag runner 26 through the end wall 20a into the enclosure interior and discharges onto a respective vibratable deflector plate 28 and thence onto the respective pelletizer, which comprises a drum supported at each end for rotation about a horizontal axis and driven in the direction of arrow 30 by a drive motor (not shown). The drum is provided internally with water for cooling, while an external water spray system consisting of transversely-extending supply pipes 32 and 34 carrying respective series of nozzles sprays water onto the slag to mix with it and produce the desired pyroplastic state for pelletization prior to it impinging on the pelletizer. Each pelletizer drum is provided with a number of circumferentially-spaced radially-extending longitudinal fins which throw the slag into the air in the required direction and with the required trajectory, so that it lands as a pile 36 of cooled self-sustaining slag pellets some distance from the pelletizers. More details of typical processes and apparatus for pelletization are given in our prior U.S. Pat. Nos. 4,414,016 and 4,451,221, the disclosures of which are incorporated herein by this reference.

Inevitably, some of the molten slag tends to fly in directions other than that desired and the enclosure 20 is therefore necessary to confine the pellets and protect the surrounding apparatus and adjacent personnel. A typical installation as illustrated has a width of approximately 10.7 meters (35 ft.), a length of approximately 18.3 meters (60 ft.) and a height of approximately 12.2 meters (40 ft.). The enclosure is topped by a solid continuous roof 38 having a horizontal centre section and two end sections 50 of different lengths which slope from the centre section down towards the respective ends of the enclosure, the end section above the pelletizers being the shorter of the two. The walls and the roof may be considered for practical purposes as gas and vapour impervious although in a commercial structure there is likely to be a number of openings, such as above the runner and for the entry and exit of water pipes, through which small amounts of gases and vapours can escape. Because of the extremely hostile environment caused by the molten slag and the hot acid gases that are produced the lower portions of the enclosure walls are made of iron plate of 2.5 cm (1 in) thickness, while the upper portions are of corrugated galvanised sheet iron of 6.3 cm (0.25 in) thickness mounted on a galvanized steel support framework, which also supports the roof. The specific structure of the walls and their support framework does not constitute part of this invention, and for simplicity of illustration these details are not shown.

As described above, the operation of the pelletization process results in the production of substantial quantitites of steam, heated air, hot gaseous reaction products and particulate material, all of a nature and structure unique to this process. The steam and heated reaction products arise as described above, while the very substantial quantities of heated air arise from the ambient air that is deliberately entrained with the airborne slag in order to cool it, if necessary by the use of pressure and induction fans. To assist in this entrainment and because of the large quantities of gas and vapour products that have been involved prior processes (typically about 7,000,000 to 9,900,000 liters per min, corresponding to about 250,000 to 350,000 cfpm), in prior art enclosures the roof 38 has been made of wire mesh material and the end 20c has been left completely open to facilitate their exit from the enclosure interior, which also permits relatively free escape of the very considerable amount of noise that is generated during operation.

In addition to the foamed or expanded pellets constituting the majority of the final material, solid pellets are produced of a wide range of sizes from dust upwards, together with the low-density strand or fibrous material. In the past use has been made of part of this fibrous particulate material to cooperate with the mesh roof in separating the remainder of the material from the gas and vapour stream, the first-produced fibres which deposit on the undersurface of the mesh roof quickly forming a filter mat that is quite effective in removing the subsequently-produced fibrous material from the air stream, while still permitting the gases to flow therethrough.

To assist in explanation of the invention, the enclosure of the invention may be considered as having its interior divided longitudinally in the direction of movement of the projected slag at two transverse planes 40 and 42 into three separate zones 44, 46 and 48; in practice of course there is no abrupt separation between these zones. The first zone 44 is the pelletizer containing zone in which, as described above, carefully controlled amounts of water are added to the slag through the nozzles on the pipes 32 and 34, the amount of water being just sufficient to produce the required pyroplastic state and all of it being "consumed" in this part of the process, that which does not take any part in the chemical reactions being delivered into this zone in gaseous form (i.e. superheated water vapour). It will be noted that there is no attempt to introduce any cooling air into the enclosure interior and, depending upon the particular process conditions, some may be induced in the opening left for the runner 26, or some may be expelled if the internal pressure in this first zone is higher than ambient.

The second zone 46 is a water-cooled zone in which the gases (at this temperature there are unlikely to be any vapours present) that are passing through the zone above the pellet pile 36 are cooled by the injection of water in very fine spray form from a series of pipes 50 disposed close to the underside of the roof and carrying downwardly-directed spray nozzles 52 which are of a type that can deliver a relatively large volume of water in the form of the required very fine mist. The quantity of water supplied and particularly the droplet size of the spray are made such that all of this water is vapourised in the second zone and none of it is able to reach the slag pile and add to its moisture content. Thus the conditions are made to be such the gases are cooled by use of the latent heat of vapourisation of the water to as low a temperature as possible, but are not cooled below 100° C. so that they remain in the gaseous state; there will therefore not be any droplets remaining to fall on the slag pile. Typically cement manufacture requires a maximum moisture content of about 6% by weight, and customers will accept values in the range 5–7%; for some special applications customers require completely dry pellets. The prior art pelletizing processes have generally produced slags with moisture contents of 8% or higher due to the relatively inefficient manner in which large quantities of water have been employed together with induced air to obtain the necessary cooling. The much more efficient use of a smaller quantity of water in this special second cooling zone enables the direct production by the process of pellets that meet the dryness requirement of about 6% by weight or lower. The completely dry material will still require an additional drying step.

A typical path for the gases through the three zones is indicated by the arrows 50. The third zone 48 is in this embodiment constituted by the interior of a sub-enclosure formed by a vertical wall 52 and a lower horizontal wall 54 in conjunction with the adjacent portions of the roof 38, side wall 20b and end wall 20c. The gases and vapour entering the sub-enclosure are at a temperature close to water condensation temperature and are now scrubbed and heavily saturated with water sprayed from a series of nozzles mounted on supply pipes 56 and 58 disposed adjacent the walls 52 and 20c; other sets of nozzles may also be provided adjacent the side walls 20b and directing their water sprays transversely of the sub-enclosure interior. The much smaller quantity of gas etc. form the first and second zones, for example reduced from the prior art amount of about 8,500,000 liters per min (300,000 cfpm) to about 2,000,000 liters per min (70,000 cfpm), is so throughly saturated with this third zone water that the temperature of the water vapour is reduced well below the condensation value (e.g. to about 80° C.) so that it is condensed back to water which also scrubs the gas and vapour mixture to entrain the hydrogen sulfide and the particulates. Since this third zone water does not reach the slag pile and can be recycled, as described below, it can be used quite generously. The subsequent handling of the scrubbed gases and the condensate can vary, as will be described below.

Figure 2:
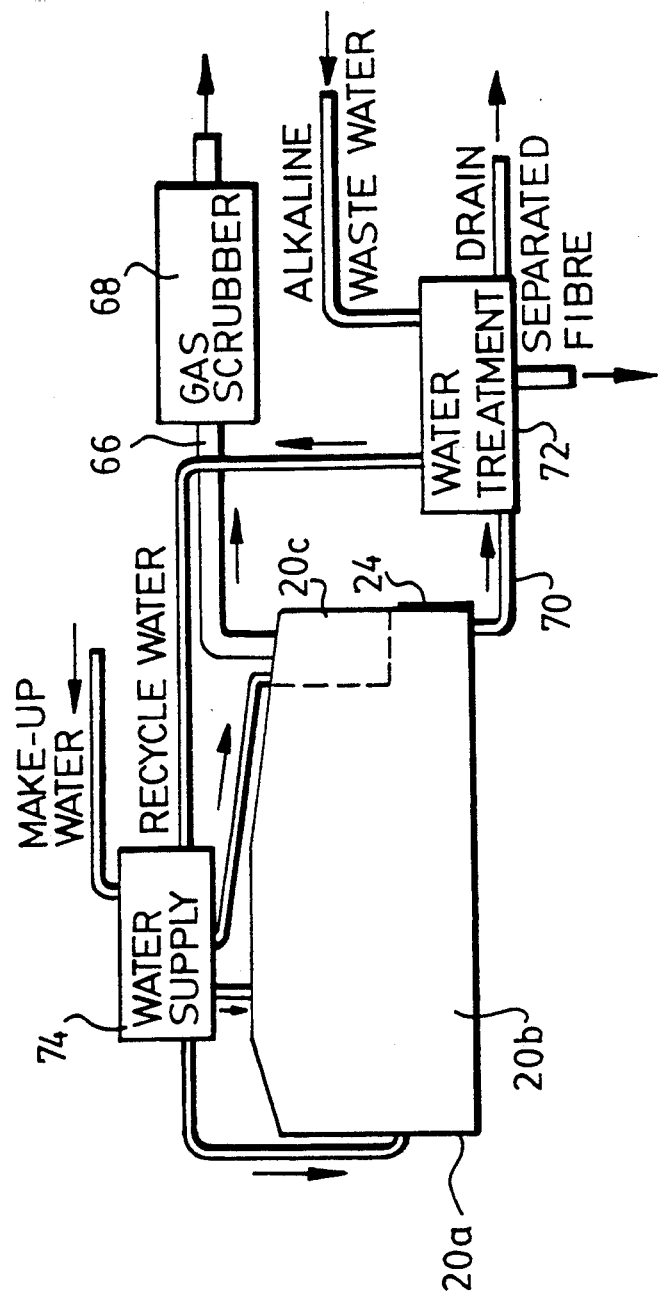
FIG. 2 is a schematic diagram to illustrate a pelletizer installation.

Thus, if the scrubbed gases are sufficiently clean they can be discharged from the enclosure via a chimney 60 that exits at 62 from the interior of the third zone sub-enclosure. If necessary the chimney can have an axial fan 64 mounted therein to assist in extracting the gases from the enclosure without requiring the chimney to be of too great height. In an alternative arrangement illustrated by FIG. 2 the gases from outlet 62 pass via a conduit 66 to a gas scrubber 68 which will reduce both the hydrogen sulfide and fibre contents to the required values. The condensed water collects at the bottom of the sub-enclosure and passes via a pipe 70 either directly to a drain or, as illustrated by FIG. 2, to a water treatment unit 72 in which the entrained hydrogen sulfide is neutralised and the fibres are separated out. Any water which drains to the bottom of the main enclosure 20 passes to a pipe 74 which can also be connected to the drain or to the unit 72. Clean water from the unit 72 can be recycled to a water supply unit 74 from which it is fed to the various nozzles for an appreciable saving in the total water requirement for the system, whereas much of the water used in the prior art and systems was lost into the atmosphere.

A particularly advantageous aspect of the invention is that many steel plants that are the sources of these slags also have alkaline waste water (e.g. about pH 12) that can be supplied to the water treatment unit to neutralize the hydrogen sulfide, so that it is not released from the water that is sent to the drain. In the absence of such a supply the hydrogen sulfide must be stablised by the use of alkaline chemicals added in the unit 72.

Another particularly advantageous aspect of the invention is that the process is carried out, and the apparatus operates, within a totally enclosed space so that the ambient noise level outside of the enclosure is reduced considerably to very acceptable values as compared with prior art processes and apparatus.

The throughput of such an apparatus is typically of the order of about 600 tons of slag per day (10 slag discharges per day each of about 60 tons). The water supply to the first zone is usually at the rate of about 1600 to 3200 liters (350 to 700 Imp.galls) per minute, while the mist-producing nozzles 52 of the second system, which will only need to be operative during the period of about 30–45 minutes that the slag is being delivered from the furnace, requires the delivery of about 45 to 1100 liters (10 to 250 Imp gals.) of water per minute to provide the desired cooling. The spray-producing nozzles of the third zone will require the supply of at least about 200 to 1400 liters (50 to 300 Imp gals.) per minute, but the sprays can be relatively coarse and there are a number of commercially available nozzles that will be satisfactory. A particularly suitable nozzle 52 for use in the second zone is that sold by John Brooks Company Limited under the designation (A.E.) assisted atomizer nozzle having a droplet or particle size in the range 80 to 300 microns.

Although particular processes and apparatus have been described herein, it will be apparent to those skilled in the art that various changes and modifications can be made in specific details thereof, within the scope of the appended claims.

We claim:

1. A slag pelletization enclosure in combination with rotary pelletization apparatus of the type with which a stream of slag material to be pelletized is thrown into the ambient air as a shower thereof for a sufficient distance for it to separate and cool and to produce a pile of self-sustaining pelletized material on the ground within the enclosure, the enclosure enabling the removal from the enclosure interior atmosphere of water soluble gases and airborne particulate material created during the process of operation of the pelletization apparatus, the enclosure interior having successive first, second and third zones and the enclosure comprising:

air impermeable walls and a roof forming a unitary enclosure interior of sufficient size to comprise at least the first and second zones and enclose at least one rotary pelletizer, the shower or showers of molten slag projected therefrom, and the resultant pile of pelletized material, one of the enclosure walls having a closable opening for removal of pelletized material from the enclosure interior;

the first zone having therein said at least one rotary pelletizer, means for feeding molten slag material to be pelletized thereto, and controllable water supply means for supplying first zone pelletization water to the slag material prior to its pelletization in an amount and at a rate sufficient to convert it to a pyroplastic state suitable for pelletization;

the second zone being adapted to contain the shower of pelletizing slag material and the pile of pelletized material and having therein below the roof a plurality of second zone water supply nozzles for supplying second zone water to the upper part of the second zone to cool gases passing therethrough by use of the latent heat of evaporation of the second zone water, the second zone nozzles supplying the second zone water in a particle size such that all of the water thus supplied can be vapourised in the zone;

controllable water supply means connected to the second zone nozzles and controllable to supply second zone water thereto in a quantity such that all of the water thus supplied can be vapourised in the second zone;

whereby the gases and entrained water vapour in the second zone are cooled to a temperature above that of condensation of the water; and p1 the third zone having therein third zone water supply means supplying third zone water to the zone to further cool the gases passing therethrough;

controllable water supply means connected to the third zone water supply means and controllable to supply third zone water thereto in a quantity and at a rate such that the gases are cooled below the condensation temperature thereof;

an exit from the enclosure interior for non-condensible gases; and an exit from the enclosure interior for condensed water with any particulate material entrained therein.

2. An enclosure as claimed in claim 1, and including a sub-enclosure within the enclosure constituting the third zone, the exit for non-condensible gases being disposed in the upper part of the sub-enclosure and the exit for condensed water being disposed in the lower part of the sub-enclosure.

3. An enclosure as claimed in claim 1, and including a chimney connected to the exit from the third zone for non-condensible gases.

4. An enclosure as claimed in claim 3, wherein the chimney has therein an exhaust fan for inducing flow of the gases through the enclosure interior.

5. An enclosure as claimed in claim 1, wherein the second zone water supply nozzles comprise a plurality of water mist producing nozzles mounted closely adjacent to the underside of the enclosure roof.

6. An enclosure as claimed in claim 1, and including a gas scrubber for removal of soluble gases and particulate material to required maximum values connected to the exit from the third zone for non-condensible gases.

7. An enclosure as claimed in claim 1, and including a water treatment unit for stabilisation of hydrogen sulfide and removal of particulate matter entrained in the water connected to the exit for condensed water.

8. An enclosure as claimed in claim 7, and including means for feeding alkaline waste water to the water treatment unit for stabilisation of the hydrogen sulfide.

9. A method of operating a slag pelletization enclosure for pelletization apparatus enabling the removal from the enclosure atmosphere of water soluble gases and airborne particulate material created during the process of operation of the pelletization apparatus to produce within the enclosure a pile of slag pellets:

the enclosure having successive first, second and third zones and comprising air impermeable walls and a roof, one of the enclosure walls having a closable opening for removal of pelletized material from the enclosure interior;

the first zone having therein a pelletizer, means for feeding molten slag material to be pelletized thereto, and controllable water supply means for supplying first zone pelletization water to the slag prior to its pelletization;

the second zone containing the pile of slag pellets and having therein controllable water supply means for supplying second zone water to the zone to cool gases passing therethrough by use of the latent heat of evaporation of the second zone cooling water; and the third zone having therein controllable water supply means supplying third zone water to the zone to further cool the gases passing therethrough;

an exit from the enclosure interior for non-condensible gases; and an exit from the enclosure interior for condensed water with any particulate material entrained therein;

the method including the steps of:

supplying molten slag to the pelletization apparatus and operating it to pelletize the molten slag and produce the pile of pelletized material;

supplying the first zone water to the slag in the first zone in an amount and at a rate sufficient to convert it to a pyroplastic state suitable for pelletization;

supplying the second zone water to the second zone in a quantity, at a rate, and in a particle size such that all of the water thus supplied is vapourised in the zone and the gases and entrained water vapour are cooled to a temperature above that of condensation of the water;

supplying the third zone water to the third zone in a quantity and at a rate such that the gases are cooled below the condensation temperature thereof; and removing from the third zone the resultant non-condensible gases and condensed water.

10. A method as claimed in claim 9, wherein the third zone is constituted by a sub-enclosure within the enclosure, the exit for non-condensible gases being disposed in the upper part of the sub-enclosure and the exit for condensed water being disposed in the lower part of the sub-enclosure.

11. A method as claimed in claim 9, wherein the non-condensible gases exit from the third zone through a chimney connected to the exit.

12. A method as claimed in claim 11, wherein the chimney has therein an exhaust fan for inducing flow of the gases through the enclosure interior.

13. A method as claimed in claim 9, wherein the controllable water supply means for the second zone comprise a plurality of water mist producing nozzles mounted adjacent to the underside of the enclosure roof.

14. A method as claimed in claim 9, wherein the exit from the third zone for non-condensible gases is connected to a gas scrubber through which the gases pass for removal of soluble gases and particulate material to required maximum values.

15. A method as claimed in claim 9, wherein the exit for condensed water is connected to a water treatment unit through which the condensed water passes for stabilisation of hydrogen sulfide and removal of particulate matter entrained in the water.

16. A method as claimed in claim 7, wherein alkaline waste water is fed to the water treatment unit for stabilisation of the hydrogen sulfide.

* * * * *